UNITED STATES PATENT OFFICE.

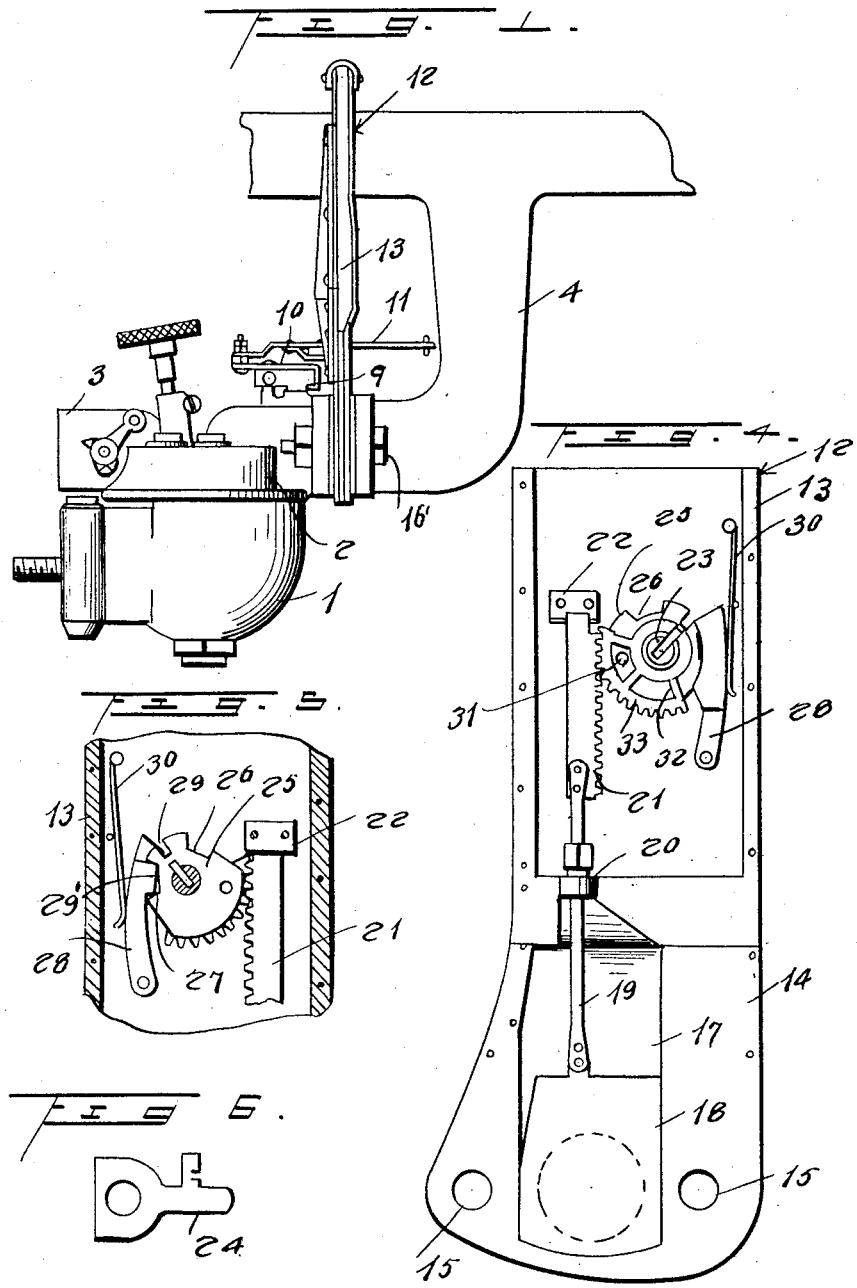

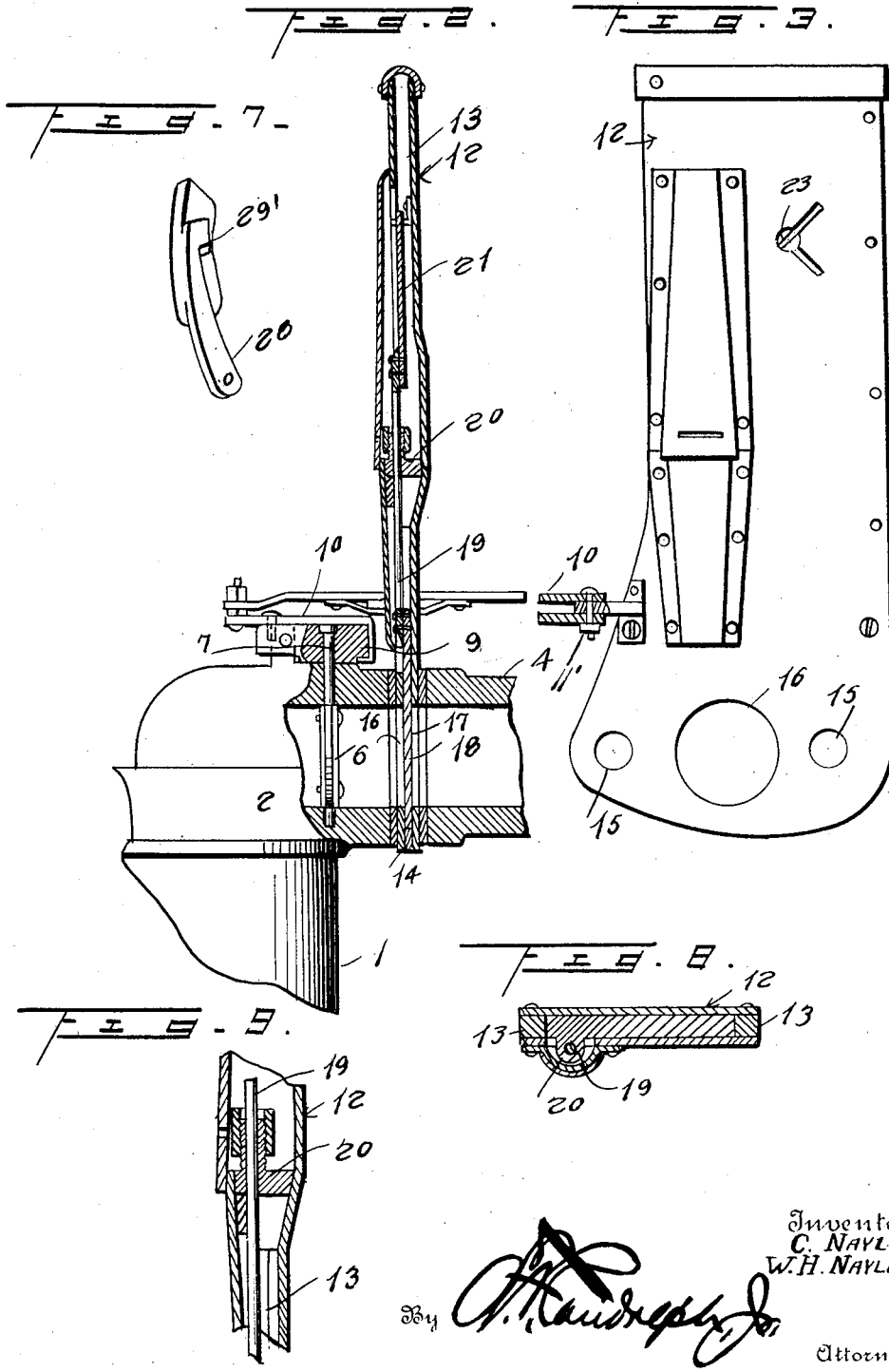

WILLIAM HOWARD NAYLOR AND CAM NAYLOR, OF MANCHESTER, OHIO.

AUTOMOBILE GASOLENE-CONTROL LOCK.

1,331,120.  Specification of Letters Patent.  Patented Feb. 17, 1920.

Application filed June 14, 1918. Serial No. 240,088.

*To all whom it may concern:*

Be it known that we, WILLIAM HOWARD NAYLOR and CAM NAYLOR, citizens of the United States, residing at Manchester, in the county of Adams and State of Ohio, have invented certain new and useful Improvements in Automobile Gasolene-Control Locks; and we do hereby declare the following to be a full, clear, and exact description of the invention, such as will enable others skilled in the art to which it appertains to make and use the same.

This invention relates to improvements in automobile gasolene control locks, and has for one of its objects the provision of means adapted to be moved into a closed position and be locked for cutting off the supply of fuel to the engine of the automobile, thus preventing the starting of the same by an unauthorized person.

Another object of this invention is the provision of a device of the above stated character, which can be readily installed on an automobile between the carbureter and manifold of the engine, so that the fuel from the carbureter can be entirely cut off when desired, and one which will be simple, durable and efficient, and which may be manufactured and sold at a comparatively low cost.

With these and other objects in view, as will become more apparent as the description proceeds, the invention consists in certain novel features of construction, combination and arrangement of parts as will be hereinafter more fully described and claimed.

For a complete understanding of our invention, reference will be had to the following description and accompanying drawings, in which:

Figure 1 is a side elevation of an automobile gasolene controlled lock, constructed in accordance with our invention, Fig. 2 is a fragmentary vertical sectional view of the same, Fig. 3 is an enlarged front elevation, partly in section of the lock casing, Fig. 4 is a similar view with the front wall of the casing removed, Fig. 5 is a fragmentary sectional view, looking at the opposite sides of the lock from that shown in Fig. 4, Fig. 6 is a plan view of a key, Fig. 7 is a perspective view of the locking jaws, Fig. 8 is a detail sectional view, illustrating an offset portion of the lock casing for slidably receiving an actuating rod, Fig. 9 is a fragmentary sectional view, illustrating the manner of slidably mounting said rod.

Referring in detail to the drawings, the numeral 1 indicates an ordinary carbureter having the usual outlet pipe 2 and air inlet 3. The outlet pipe 2 is adapted to be connected in the ordinary manner to a manifold 4 of an engine. The outlet pipe 2 of the carbureter is provided with the usual controlling valve 6 having the stem 7, carrying at its upper end a block 9 to which a plate 10 is secured. The plate 10 has a curved lever 11 connected to one end thereof by a pin and slot connection, and said curved lever is pivotally supported by a lock casing 12 as shown at 11'. The curved lever is adapted to have the usual throttle lever connected to the same for opening and closing the controlling valve 6.

The lock casing 12 is of hollow formation, as illustrated at 13, and has formed upon its lower end an extension 14, provided with oppositely disposed openings 15 to receive bolts 16', which connect the outlet pipe 2 of the carbureter 1 to the manifold 4, and the extension 14 is provided with a passage 16, adapted to be alined with the passage through the outlet pipe 2 and that of the manifold 4, so that the fuel from the carbureter can readily pass through the extension 14 into the manifold. The extension 14 consists of companion walls or layers of material, and one of them is provided with a groove 17 adapted to slidably receive a plate 18. When the plate 18 is in its lowest position it entirely closes the opening 16, preventing the fuel from passing from the carbureter 1 into the manifold, thus preventing the starting of the engine. An actuating rod 19 is secured to the plate 18 and slidable within a bearing 20 within the lock casing 12, and has secured to its upper end a rack bar 21. The upper end of the rack bar 21 is slidably mounted in a guide bracket 22.

A key barrel 23 is rotatably secured within the casing and the casing is provided with a double key opening in registration with the same, so that a key 24 can be readily inserted within the key barrel. A plate 25 is journaled on the key barrel 23, and is provided with notches 26 and 27 adapted to be alternately engaged by a pivoted locking dog 28, having formed upon its under face a shoulder 29' adapted to fit within said notches. The plate 25 is provided with a notch 29 between the notches 26 and 27, and is adapted to receive the bit of the key for causing the plate to rotate with the barrel on turning of the key within the keyhole of the casing. A leaf spring 30 is secured to the casing and has its free end disposed against the dog 28 for urging the same into engagement with the edge of the plate, and which will force the shoulder of the dog within either of the notches 26 or 27 when registered therewith. An offset portion 31 is formed upon the plate 25 and fits within or between the spokes 32 of a segment 33. The segment 33 is journaled upon the key barrel, and is provided with teeth that mesh with teeth of the rack bar 21. The hub of the segment 33 is provided with a slot to permit the bit of the key to extend through the same and enter the slot 29 of the plate 25. When the plate 18 is in a closed position, cutting off the supply of fuel to the manifold, the shoulder on the dog 28 fits within the notch 27, preventing the plate from being accidentally raised. Upon inserting the key 24 in the key barrel 23, the bit thereof engages the dog adjacent its free end, rocking the same upon its pivot against the tension of the spring and disengaging the shoulder 29 from the notch 27, permitting the plate and segments to rotate with the turning of the key. Upon rotation of the segment, the rack bar is caused to move upwardly, carrying with the same the plate 18, permitting the fuel to pass through the opening 16 of the extension 14 into the manifold of the engine. When the plate 18 is in an open position, the shoulder upon the dog engages the notch 26 holding the plate in said position, making it necessary that the key be again inserted to disengage the dog, or shoulder thereof, from the notch 26 in order that the plate 18 be returned to a closed position. The bit of the key in this instance engages the dog adjacent its pivoted end to disengage the shoulder 29' from the notch 26.

While we have shown and described the preferred embodiment of our invention, it will be understood that minor changes in construction, combination and arrangement of parts may be made without departing from the spirit and scope of the invention as claimed.

Having thus described our invention what we claim, is:

A fuel control for engines comprising a lock casing having an opening adapted to be positioned between the outlet opening of a carbureter and the manifold of an engine, a plate slidable in said casing for opening and closing the opening, a rack bar connected to said plate, a key barrel journaled in said casing, a segment carried by said key barrel and in mesh with the rack bar, a plate carried by the key barrel and having a pair of notches and an intermediate notch, a lug formed on said plate and engaging the segment, and a spring actuated dog adapted to engage either of the notches of the pair for locking the segment against rotation, said intermediate notch being adapted to be engaged by a key.

In testimony whereof we affix our signatures in presence of two witnesses.

WILLIAM HOWARD NAYLOR.
CAM NAYLOR.

Witnesses:
  A. H. HOLDERNESS,
  ROY HOLDERNESS.